PERMANENT STORAGE TYPE MEMORY

Filed July 30, 1962

3 Sheets-Sheet 1

INVENTOR.
MORTON H. LEWIN
BY John V. Regan
Attorney

PERMANENT STORAGE TYPE MEMORY

Filed July 30, 1962 3 Sheets-Sheet 2

INVENTOR.
MORTON H. LEWIN
BY John V. Regan
Attorney

April 26, 1966 M. H. LEWIN 3,248,711

PERMANENT STORAGE TYPE MEMORY

Filed July 30, 1962 3 Sheets-Sheet 3

INVENTOR.
MORTON H. LEWIN
BY John V. Regan
Attorney

3,248,711
PERMANENT STORAGE TYPE MEMORY

Morton H. Lewin, Princeton, N.J., assignor to Radio Corporation of America, a corporation of Delaware Filed July 30, 1962, Ser. No. 213,496
10 Claims. (Cl. 340—173)

The present invention relates to an improved memory of the permanent storage type.

The memory of the invention includes column and row conductors. Memory elements, such as capacitors, couple certain of the column conductors to certain of the row conductors. A plurality of two-state devices, such as tunnel diodes, are coupled one to each row conductor. The two-state devices are normally in a first state. Driver means apply interrogating signals to one or more of the column conductors in a sense to switch those two-state devices which receive the signals to their second state. A circuit subsequently applies a read-out signal to a row conductor of the memory not connected to any two-state device that has switched to the second state. Circuits coupled to at least some of the column conductors sense the signals, if any, developed on said column conductors in response to the read-out signal.

The memory of the invention is useful in a number of applications including table look-up, control "housekeeping" and code conversion. In one version of the memory discussed in detail below, any one or more columns of the memory can be interrogated with a tag word and signals appearing on any one or more columns of the memory can be sensed to determine if there is a word or words in the memory which correspond to the tag word. This type of memory is termed a "content-addressed" or "catalog" memory.

An important feature of the invention is that it is easy to fabricate. The column and row conductors can be printed windings on an insulating medium and the memory elements, such as capacitors, can also be printed on the same medium. Using two-state devices such as tunnel diodes, these too can be placed on the same medium. As a matter of fact, the memory can be placed on a single "card." The arrangement of the memory is such that the tolerance requirements on the two-state devices, such as tunnel diodes, are relatively low. Nevertheless, the operating speed of the memory is relatively high.

The invention is discussed in greater detail below and is described in the following drawing of which:

Figure 1:
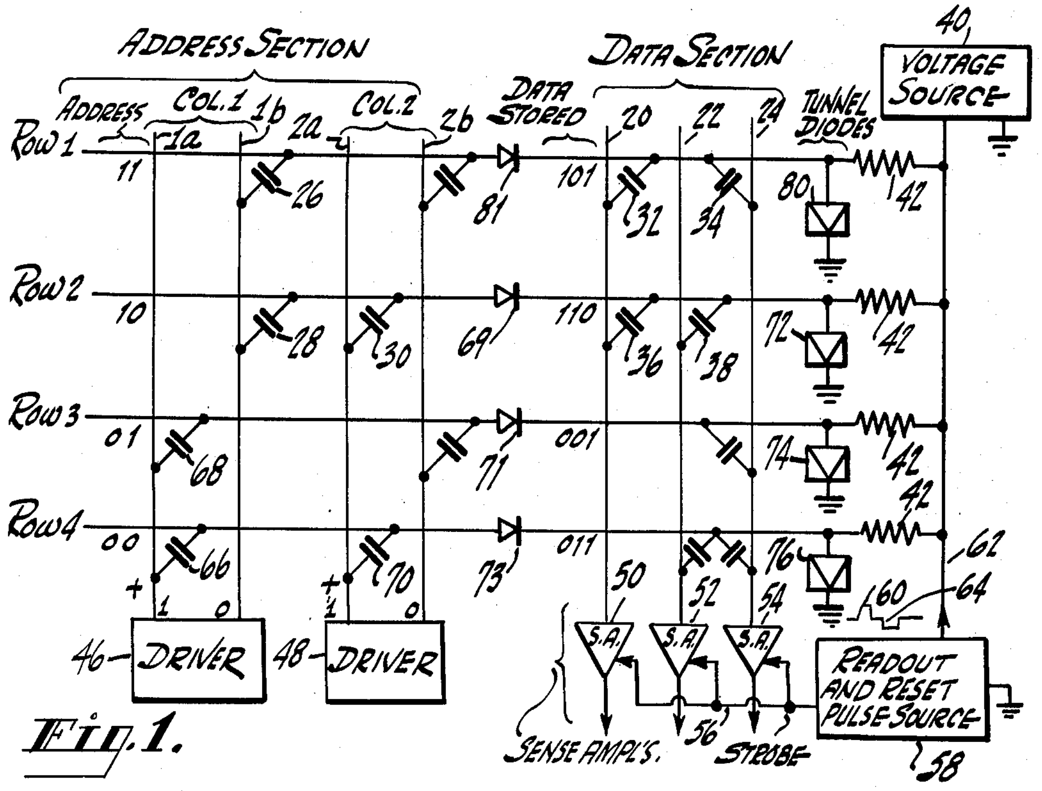
FIGURE 1 is a block and schematic diagram of one embodiment of the present invention.

The memory shown in FIG. 1 includes row conductors and column conductors. There are two sections to the memory, namely an address section and a data section. The address section is shown to include two columns, legended col. 1 and col. 2, respectively, and each of these columns include two conductors. The data section of the memory is shown to include three columns 20, 22 and 24, each of these columns includes only one conductor.

For the purpose of simplifying the explanation, the memory is illustrated to have a relatively few number of storage locations. In practice, the memory of the invention may be much larger and may, for example, include well upwards of 100 columns and 100 rows and a corresponding number of storage locations.

The memory elements themselves are shown as capacitors such as 26 and 28 and so on. In the address section, there is a capacitor connected between only one of the conductors of each column and each row. For example, there is a capacitor 26 connected between column conductor 1*b* and row 1 (the row conductor for row 1), but no capacitor connected between column conductor 1*a* and row 1. In a similar manner, there is capacitor 30 connected between column conductor 2*a* and row 2, but no capacitor connected between column conductor 2*b* and row 2. In the data section the presence of a capacitor at a particular row-column intersection represents the binary digit "1" and its absence represents the binary digit "0." For example, the capacitors 32 and 34 connected to row 1 represent the storage of the word 1 0 1 in row 1. Similarly, the capacitors 36 and 38 connected to row 2 represent the storage of the word 1 1 0. In each case, the "zero" is indicated by the absence of the capacitor.

Figure 3:
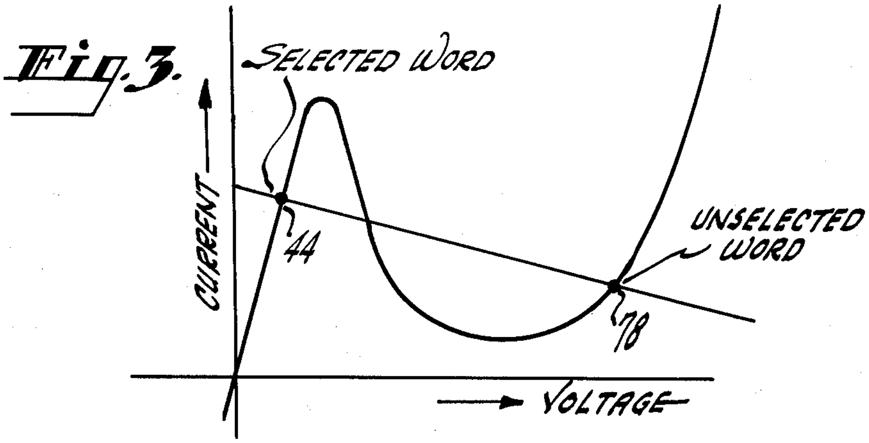
FIGURE 3 is a characteristic of current versus voltage for a tunnel diode to help explain the operation of the memory.

There is a plurality of two-state devices, shown in FIG. 1 as tunnel diodes, one connected to each row. The voltage source 40 and resistors 42 have a value such that they represent a substantially constant current source. The tunnel diodes are normally biased to their low voltage state as indicated by operating point 44 in FIG. 3.

Drivers 46 and 48 are connected to the conductors of columns 1 and 2, respectively. The columns 20, 22 and 24 of the data section lead to sense amplifiers 50, 52 and 54, respectively. These sense amplifiers are normally in an inoperative condition but are enabled when a strobe pulse is applied to the amplifiers via lead 56. The strobe pulse is produced by the read-out and reset pulse source 58. The strobe pulse is concurrent with the positive pulse 60 which is applied to lead 62. The source 58 also produces a reset pulse 64 which follows the pulse 60.

In operation, the drivers 46 and 48 first apply a two bit address word to the memory. The address word may, for example, be 1 1. A 1 corresponds to a positive voltage pulse applied to the *a* column conductor and a 0 corresponds to a positive voltage pulse applied to the *b* column conductor. The remaining column conductor, in each case, may be grounded. Therefore, the address word 1 1 corresponds to a positive voltage pulse applied to column 1*a* and a positive voltage pulse applied to column 2*a*, and columns 1*b* and 2*b* are grounded. The positive voltages are coupled through capacitors 66, 68, 70 and 30 to rows 2, 3 and 4 conductors. These voltages are in the forward direction with respect to diodes 69, 71 and 73 and are therefore applied through the diodes to the tunnel diodes 72, 74 and 76. The drive voltage amplitude and the size of the capacitors are so chosen that the amount of signal coupled to a row through a single capacitor is sufficient to switch the tunnel diode connected to that row to the high state. Thus, tunnel diodes 72, 74 and 76 are switched to the high state (operating point 78 in FIG. 3). However, since there is no capacitor coupling from either columns 1*a* or 2*a* to row 1, row 1 does not receive a driving signal and tunnel diode 80 remains in the low state.

In order to read-out a word in the memory, the read-out and reset pulse source 58 applies a positive pulse 60 to lead 62. The positive pulse is of sufficient amplitude to switch any of the tunnel diodes remaining in the low state to the high state. Tunnel diode 80 is in the low state and it switches and produces a substantial output signal which is applied to row 1. This output signal is coupled through capacitors 32 and 34 to the column conductors 20 and 24. Diode 81, which is located between the data and address section, is reverse biased by this output signal and prevents any loss of this signal to the drivers. During the interval of pulse 60, the strobe pulse on lead 56 enables the sense amplifiers 50, 52 and 54. Therefore, these sense amplifiers read-out the signals available on columns 20, 22 and 24, namely, the word 1 0 1 which is stored in row 1.

The pulse 60 is applied also to tunnel diodes 72, 74 and 76. However, these tunnel diodes are already in the high state. Therefore, the voltage change ($dv/dt$) across these tunnel diodes due to the pulse 60 is relatively small and is insufficient to produce any significant feed through from rows 2, 3 and 4 to the data section columns.

After the read-out has been completed, the reset pulse source 60 applies a negative pulse 64 to all of the tunnel diodes. This pulse is of sufficient amplitude to reset all tunnel diodes to the low state 44 of FIG. 3. During the reset interval, the sense amplifiers 50, 52 and 54 are cut-off. Also, if desired, the drivers may be (electrically) disconnected from the column conductors to prevent loss of the reset signal through the coupling diodes 81, 69, 71 and 73. After reset, the memory is ready for another cycle of operation.

In the operation of the memory of FIG. 1, the tolerance requirements on the tunnel diode are not severe. The drive pulse need only be sufficiently strong that, if coupled to a row line by one capacitor, it is of sufficient amplitude to switch the tunnel diode connected to that row line to the high state. If more than this amount of signal is applied to a row line, it produces no harmful effect so that even if 2 or 3 or more capacitors couple the signal to a row line, the increased signal does not disturb the memory operation.

The signal-to-noise ratio of the memory can be made as high as desired by appropriate shaping of pulse 60. As the rise time of the leading edge of pulse 60 is decreased, the rate of change of voltage ($dv/dt$) across a tunnel diode connected to an "unselected" line becomes smaller and smaller. (An unselected line is one whose associated tunnel diode was switched to the high state by the driver signals.) However, the signal due to the switching of the tunnel diode connected to a selected row still has an extremely first rise time. Note, in this connection, that the pulse 60 is shown to have a relatively gradually rising leading edge.

Figure 4:
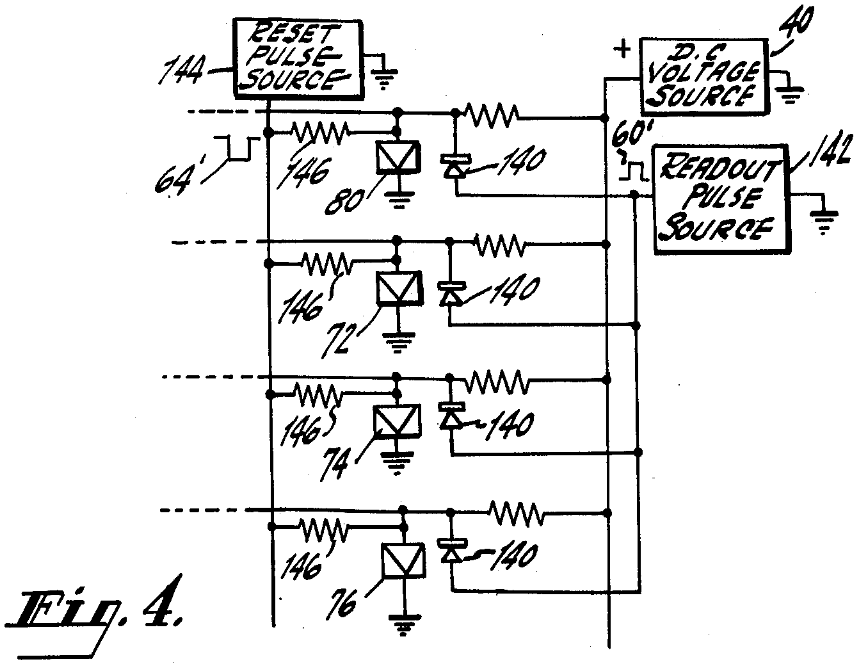
FIGURE 4 is a block and schematic diagram of a modified form of read-out circuit for the memory of FIG. 1.

An alternate arrangement for reading out the memory of FIG. 1 is shown in FIG. 4. The tunnel diodes are normally biased to their low voltage state by a constant current source just as in the arrangement of FIG. 1. However, the read-out pulse 60′ is applied from source 142 through a coupling diode 140. Assuming germanium tunnel diodes and germanium positive resistance diodes 140, a read-out pulse having an amplitude of about +½ volt would be suitable. If a tunnel diode such as 80 is in its low state and a ½ volt pulse 60′ is applied to the coupling diode 140, the coupling diode conducts and the tunnel diode 80 is switched to its high state. On the other hand, if the tunnel diode 80 is initially in its high voltage state (corresponding to a voltage of 0.4 volt or so across the tunnel diode), when the read-out pulse 60′ is applied, the voltage difference developed across the coupling diode 140 is only 0.1 volt or so and this is insufficient to couple any appreciable current through the coupling diode.

The circuit of FIG. 4 is advantageous as the signal-to-noise ratio of the read-out is high. Moreover, a read-out pulse 60′, having a steep leading edge, may be employed. This is important as it permits a reduction in the period of time which must be allotted for the read-out. Note, in this connection, that in the arrangement of FIG. 1, as the leading edge of pulse 60 becomes less steep, the read-out cycle time must increase.

In the modification of FIG. 4, a separate reset pulse source 144 is employed. It is coupled to the tunnel diodes through resistors 146. Sources 144 and 142 may be controlled by separate timing pulses, from a timing pulse source (not shown).

In the memory of FIG. 1, it is preferred that the sense amplifiers 50, 52 and 54 have relatively low input impedance and that the drivers have relatively low output impedance This makes it possible for the R-C time constant in the matrix to be made small and to achieve high speed memory operation. As examples, the sense amplifiers may be transistor sense amplifiers or tunnel diode sense amplifiers. Low output impedance drivers are also well known.

As mentioned briefly, the memory of FIG. 1 may be made on a card, such as one made of Mylar. The capacitors may be made simply by etching copper from both sides of the Mylar card to provide capacitors with a dielectric material between them. A one or a zero can be stored by breaking appropriate leads to the capacitor as, for example, by punching holes through the cards. The tunnel diode fabrication can be made simple also. Since all tunnel diodes have a common cathode, it is possible to employ an integrated construction in which all diodes are formed on the same wafer of semiconductor material. The positive resistance diodes such as 81 can also be deposited directly on the card.

Figure 2:
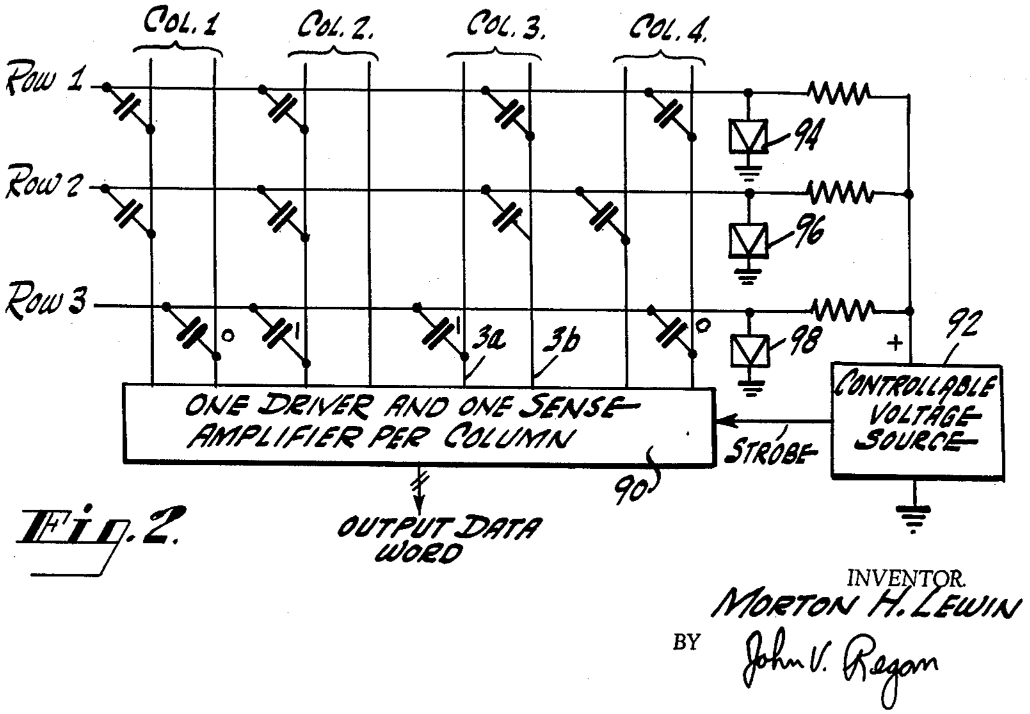
FIGURE 2 is a block and schematic diagram of another embodiment of the invention.

The memory shown in FIG. 2 is completely content-addressable. The block 90 represents a driver connected to each column and a sense amplifier connected to each column. The block 92 includes circuits which perform the function of both blocks 58 and 40 of FIG. 1.

The operation of the memory of FIG. 2 is quite analogous to that of FIG. 1. However, in the memory of FIG. 2 it is possible to interrogate any one or more columns of the memory and it is possible to read-out any one or more columns of the memory. Note that every column of the memory now includes a pair of conductors. At every row-column intersection the capacitor orientation determines the bit stored as discussed earlier. For example, column 3 can be selected to be the address section of the memory. Here, if a "one" is applied to column $3b$, tunnel diodes 94 and 96 are switched to the high state. Tunnel diode 98 remains in the low state. Now, if desired, during the interrogation interval (the interval in which tunnel diode 98 is switched to the high state), the sense amplifiers connected to columns 1, 2, 3 and 4 can be strobed. This permits the word 0 1 1 0 (the word stored in row 3) to be read-out of the memory.

While in the example above only one column of the memory is used as an address column, it is to be understood that 2, 3 or 4 columns of the memory may constitute the address. In a similar manner, any number from one to four of the columns may be sensed to determine the data stored or the part of the data stored in a row of the memory.

While the invention has been illustrated in terms of capacitor storage elements and tunnel diode two-state devices, and this structure does have important operating advantages, as discussed above, it should be appreciated that other forms of the invention are possible. For example, the storage elements may, in some cases, be resistors or appropriately poled diodes. Similarly, the tunnel diodes can instead be replaced with cores or two-state devices such as flip-flops.

Figure 5:
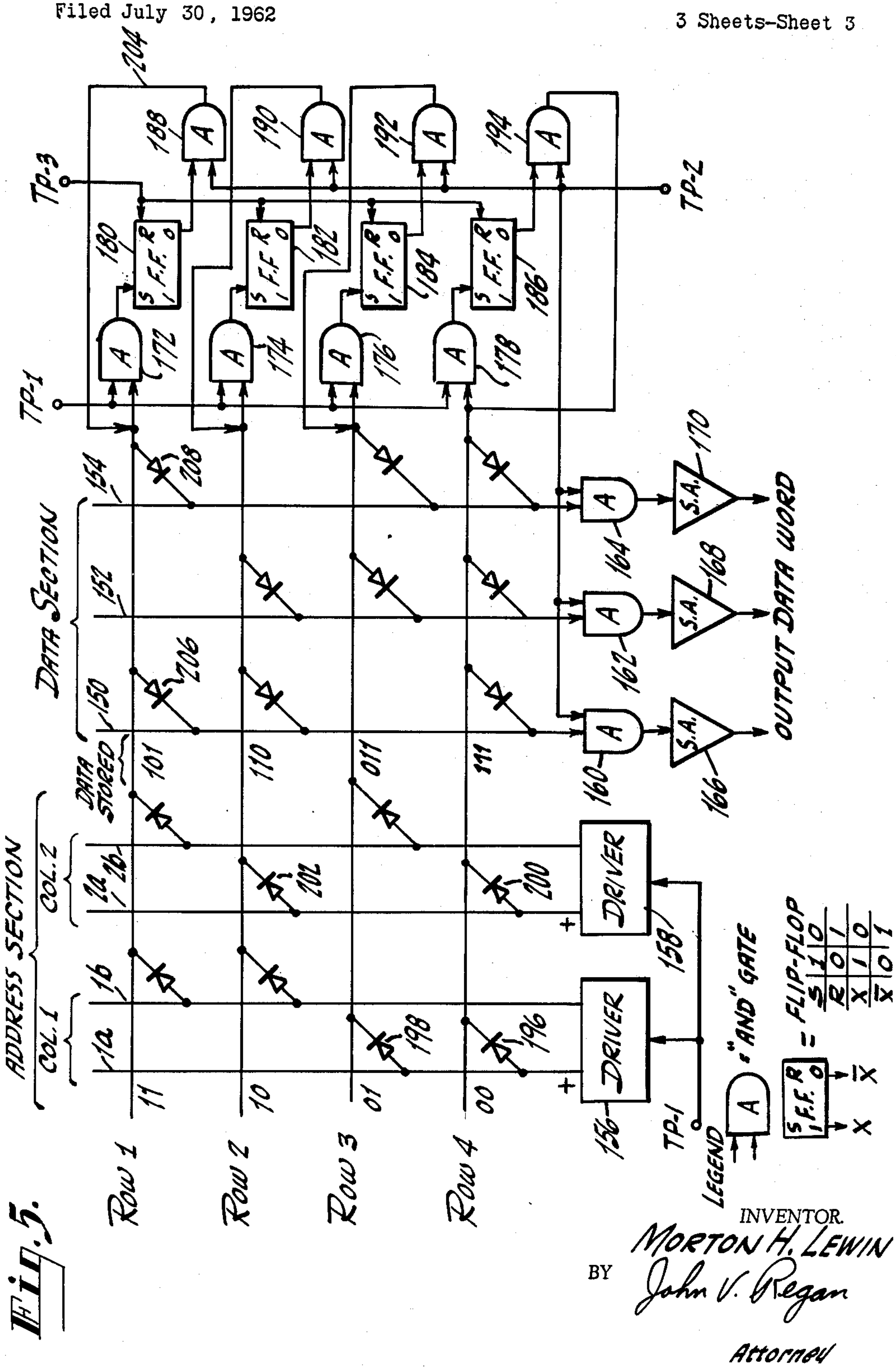
FIGURE 5 is a block and schematic drawing of another embodiment of the invention.

A memory employing diodes as the memory elements and flip-flops as the two-state devices is shown in FIG. 5. As in the case of the memory of FIG. 1, two columns, each with two conductors, make up the address section of the memory. Three columns 150, 152 and 154, each having one conductor, make up the data section of the memory. The diode memory elements of the address section are connected at their anode to a column conductor and at their cathode to a row conductor. The diode memory elements of the data section are connected at their cathode to a column conductor and at their anode to a row conductor.

Drivers 156 and 158 are connected to columns 1 and 2, respectively. These drivers are normally inactive but are rendered operative in response to a timing pulse TP–1.

The three data columns are connected through AND gates 160, 162 and 164, respectively, to sense amplifiers 166, 168 and 170, respectively. The sense amplifiers are in condition to conduct and produce an output signal when they receive an input from the AND gates.

The four rows are connected through AND gates 172, 174, 176 and 178, respectively, to the set terminals S of flip-flops 180, 182, 184 and 186, respectively. The respective 0 output terminals of the four flip-flops are connected to AND gates 188, 190, 192 and 194.

The operation of the memory is discussed in terms of a typical example. It is assumed that the drivers apply a 1, 1 to columns 1 and 2 of the memory, that is, they apply positive voltages to column conductors 1*a* and 2*a* and maintain conductors 1*b* and 2*b* at ground. The positive voltage on column conductor 1*a* causes diodes 196 and 198 to conduct. The positive voltage on column conductor 2*a* causes diodes 200 and 202 to conduct.

The timing pulse TP–1 primes AND gates 172, 174, 176 and 178. Thus, the positive voltages now on the row 2, 3 and 4 conductors pass through AND gates 174, 176 and 178, respectively, are applied to the set terminals of flip-flops 182, 184 and 186. The amplitude of the driver voltage is such that a single conducting diode coupled sufficient signal to a row lead to set the flip-flops connected through an AND gate to that row lead. Therefore, flip-flops 182, 184 and 186 are set.

The next timing pulse TP–2 primes AND gates 188, 190, 192 and 194. Of these, only AND gate 188 is connected to a flip-flop which is still reset. Therefore, only AND gate 188 is enabled and it produces an output which is applied back through lead 204 to row 1. This output, a positive pulse, passes through diodes 206 and 208 to column conductors 150 and 154. The timing pulse TP–2 also primes AND gates 160, 162 and 164. Therefore, the positive pulses pass through AND gates 160 and 164 to sense amplifiers 166 and 170. Accordingly, the output data word which is produced is 1 0 1, the word appearing on row 1. The positive voltage on row 1 does not cause current flow through the address columns as the diode memory elements of the address section are connected at their cathode to the row conductor.

The next timing pulse TP–3 is applied to the reset terminals of the flip-flops and resets the flip-flops to their original condition. The memory is then ready for the next read-out cycle.

In the examples of the invention chosen for illustration, only one word can be read-out of the memory at a time. It is also possible to read-out more than one word in the memory which correspond to a tag word. An interrogation routine which is applicable is discussed in some detail in application Serial No. 183,187, Memory, filed March 28, 1962 by the present inventor.

What is claimed is:

1. In a memory, column and row conductors; memory elements coupling certain of the column conductors to certain of the row conductors; a plurality of two-state devices, normally in a first state, one coupled to each row conductor; means for applying signals to at least one of the column conductors in a sense to switch the two-state devices connected to the row conductors coupled to that column conductor to their second state; means for subsequently applying a signal directly to all of the two-state devices for switching any remaining in the first state to the second state; and a plurality of sensing means respectively coupled to at least some of the column conductors for sensing the signals, if any, developed on these column conductors in response to the switching of said remaining devices to the second state.

2. In a memory, column and row conductors; capacitor memory elements coupling certain of the column conductors to certain of the row conductors; a plurality of two-state devices, normally in a first state, one coupled to each row conductor; means for applying signals to at least one of the column conductors in a sense to switch the two-state devices connected to the row conductors coupled to that column conductor to their second state; means for subsequently applying a signal directly to all of the two-state devices for switching any remaining in the first state to the second state; and sensing means coupled to at least some of the column conductors for sensing the signals, if any, developed on these column conductors in response to the switching of said remaining devices to the second state.

3. In a memory, column and row conductors; memory elements coupling certain of the column conductors to certain of the row conductors; a plurality of two-state devices, normally in a first state, one coupled to each row conductor; means for applying interrogating signals to one or more selected column conductors in a sense to switch the two-state devices receiving said signals through one or more memory elements to their second state; means for subsequently applying a read-out signal to a row conductor of the memory connected to a two-state device which has not switched to the second state for switching that device to the second state; and a plurality of sense amplifiers respectively connected to column conductors of the memory.

4. In a memory, column and row conductors; permanent memory elements coupling certain of the column conductors to certain of the row conductors; a plurality of two-state devices normally in a first state, one coupled to each row conductor; means for applying interrogating signals to one or more selected column conductors in a sense to switch the two-state devices receiving said signals through one or more memory elements to their second state; and means responsive to a two-state device not switched by an interrogating signal for subsequently applying a read-out signal to a row conductor of the memory connected to that two-state device.

5. In a memory, column and row conductors; capacitor memory elements respectively coupling certain of the column conductors to certain of the row conductors; a plurality of bistably operated tunnel diodes, normally in a first state, one coupled to each row conductor; means for applying interrogating signals to one or more selected column conductors in a sense to switch the tunnel diodes receiving said signals through one or more memory elements to their second state; means for subsequently applying a read-out signal to all tunnel diodes in a sense to switch them to their second state; and sensing means coupled to respective column conductors for producing output signals in response to the switching of a tunnel diode to its second state by a read-out signal.

6. In a memory, column and row conductors; permanent memory elements respectively coupling certain of the column conductors to certain of the row conductors; a plurality of two-state devices, normally in a first state, one coupled to each row conductor; means for applying interrogating signals to at least some of the column conductors in a sense to switch the two-state devices receiving an interrogating signal through one or more memory elements to their second state; means for subsequently applying a read-out signal to a row conductor of the memory connected to a two-state device which did not receive an interrogating signal comprising means coupled to said two-state device for switching it to its second state; and sensing means coupled to at least some of said column conductors for sensing the read-out signals, if any, coupled through memory elements to these column conductors.

7. A memory circuit comprising:

column and row conductors;

memory elements connecting certain of the column conductors to certain of the row conductors;

a plurality of devices capable of being operated between a first condition responsive to a read-out signal and a second condition which is non-responsive to a read-out signal, each of said devices being coupled respectively to one of said row conductors and being initially in said first condition;

means for driving some of said devices to their second state comprising means for applying a drive signal to at least one of said column conductors for placing each of said devices receiving said drive signal through one or more memory elements to its second condition; and read-out means coupled to said devices for applying a read-out signal to said memory elements, during the time the effect of the drive signal is present, by way of those devices in the first condition.

8. In a memory, column and row conductors; permanent memory elements respectively coupling certain of the column conductors to certain of the row conductors; a plurality of bistably operated tunnel diodes, normally in a first state, one coupled to each row conductor; means for applying interrogating signals to at least some of the column conductors in a sense to switch the tunnel diodes receiving an interrogating signal through one or more memory elements to their second state; means for subsequently applying a signal to a tunnel diode which did not receive an interrogating signal for switching that tunnel diode to its second state; and sensing means coupled to at least some of said column conductors for sensing the signals, if any, produced by the tunnel diode subsequently switched to its second state and coupled through memory elements to these column conductors.

9. In a memory, column and row conductors;

memory elements coupling certain of the column conductors to certain of the row conductors, the connections of memory elements from row to column conductors defining bits of the words stored in the rows of the memory;

a plurality of non-linear devices, normally in a first condition, one coupled to each row conductor;

means for applying a drive signal to at least one of the column conductors in a sense to change the condition of the non-linear devices connected to the row conductors coupled by memory elements to that column conductor to a second condition;

means for applying read-out signals to all of the non-linear devices during the period those placed in the second condition are in the second condition for changing any such devices remaining in the first condition to the second condition and thereby causing a signal pass from the row conductor coupled thereto to the column conductors coupled to said row conductor by memory elements; and means coupled to the memory for reading out bits of a word stored in the last-named row of the memory.

10. In a memory, column and row conductors;

memory elements coupling certain of the column conductors to certain of the row conductors, the connections of memory elements from row to column conductors defining bits of the words stored in the rows of the memory;

a plurality of non-linear devices, normally in a first condition, one coupled to each row conductor;

means for applying a drive signal to at least one of the column conductors in a sense to change the condition of the non-linear devices connected to the row conductors coupled by memory elements to that column conductor to a second condition;

means for applying read-out signals to all of the devices during the period those placed in the second condition are in the second condition for switching any such devices remaining in the first condition to the second condition, whereby if a non-linear element is thus switched to its second condition, a signal passes from the row conductor coupled thereto to the column conductors coupled to said row conductor by memory elements; and means responsive to the signals coupled from the last-named row conductor to column conductors for reading out bits of a word stored in the last-named row of the memory.

References Cited by the Examiner

UNITED STATES PATENTS

| | | | |
|---|---|---|---|
| 3,011,165 | 11/1961 | Angel | 340—174 |
| 3,077,591 | 2/1963 | Akmenkalns et al. | 340—173 |

IRVING L. SRAGOW, *Primary Examiner.*

T. W. FEARS, *Assistant Examiner.*